(12) United States Patent
Carpenter et al.

(10) Patent No.: US 9,773,594 B2
(45) Date of Patent: Sep. 26, 2017

(54) NON-RARE EARTH MAGNETIC NANOPARTICLES

(71) Applicant: Virginia Commonwealth University, Richmond, VA (US)

(72) Inventors: Everett E. Carpenter, Richmond, VA (US); Zachary J. Huba, Glen Allen, VA (US); Kyler J. Carroll, San Diego, CA (US); Ahmed Farghaly, Richmond, VA (US); Shiv N. Khanna, Richmond, VA (US); Meichun Qian, Richmond, VA (US); Massimo Bertino, Richmond, VA (US)

(73) Assignee: VIRGINIA COMMONWEALTH UNIVERSITY, Richmond, VA (US)

( * ) Notice: Subject to any disclaimer, the term of this patent is extended or adjusted under 35 U.S.C. 154(b) by 198 days.

(21) Appl. No.: 14/370,138

(22) PCT Filed: Jan. 4, 2013

(86) PCT No.: PCT/US2013/020214
§ 371 (c)(1),
(2) Date: Jul. 1, 2014

(87) PCT Pub. No.: WO2013/103762
PCT Pub. Date: Jul. 11, 2013

(65) Prior Publication Data
US 2015/0001437 A1    Jan. 1, 2015

Related U.S. Application Data

(60) Provisional application No. 61/582,963, filed on Jan. 4, 2012, provisional application No. 61/662,053, filed
(Continued)

(51) Int. Cl.
*H01F 1/11* (2006.01)
*C01B 31/30* (2006.01)
(Continued)

(52) U.S. Cl.
CPC .............. *H01F 1/11* (2013.01); *C01B 31/303* (2013.01); *H01F 1/0063* (2013.01); *B82Y 25/00* (2013.01)

(58) Field of Classification Search
CPC ....... B22F 9/24; B22F 2202/03; B22F 1/0018
See application file for complete search history.

(56) References Cited

U.S. PATENT DOCUMENTS 6,200,680 B1 * 3/2001 Takeda ................... A61K 8/27
423/111
2001/0009119 A1    7/2001 Murray et al.
(Continued)

FOREIGN PATENT DOCUMENTS

WO    2005077505 A2    8/2005
WO    2011-032007    3/2011

OTHER PUBLICATIONS

Veriansyah (Materials Letters, 2010, vol. 64, p. 2197-2200).*
(Continued)

*Primary Examiner* — Xiaowei Su
(74) *Attorney, Agent, or Firm* — Whitham, Curtis & Cook

(57) ABSTRACT

Continuous flow synthetic methods are used to make single phase magnetic metal alloy nanoparticles that do not contain rare earth metals. Soft and hard magnets made from the magnetic nanoparticles are used for a variety of purposes, e.g. in electric motors, communication devices, etc.

2 Claims, 7 Drawing Sheets

Related U.S. Application Data on Jun. 20, 2012, provisional application No. 61/703,460, filed on Sep. 20, 2012.

(51) Int. Cl.
*H01F 1/00* (2006.01)
*B82Y 25/00* (2011.01)

(56) References Cited

U.S. PATENT DOCUMENTS

| | | |
|---|---|---|
| 2006/0061017 A1 | 3/2006 | Strouse et al. |
| 2006/0225535 A1 | 10/2006 | Mainwaring |
| 2007/0042507 A1* | 2/2007 | Tsang .................. G01N 13/00 436/524 |
| 2008/0026929 A1 | 1/2008 | Jensen et al. |
| 2009/0308814 A1 | 12/2009 | Colvin et al. |

OTHER PUBLICATIONS

Choi (The Journal of Supercritical Fluids, 2010, vol. 52, p. 285-291).*
Veriansyah—2009 (J of Supercritical Fluids, 2009, vol. 50, p. 283-291).*
Harris et al., "High coercivity Cobalt Carbide Nanoparticles Processed Via Polyol Reaction: A New Permanent Magnet Material", Journal of Physics D: Applied Physics, 2010, vol. 43, p. 1-7.

* cited by examiner

Figure 1A and B

Figure 2A and B

$$m_{orb} = -\frac{4\int_{L_3+L_2}(\mu_+ - \mu_-)d\omega}{3\int_{L_3+L_2}(\mu_+ + \mu_-)d\omega}(10-n_{3d})$$

$$m_{spin} = -\frac{6\int_{L_3}(\mu_+ - \mu_-)d\omega - 4\int_{L_3+L_2}(\mu_+ - \mu_-)d\omega}{\int_{L_3+L_2}(\mu_+ + \mu_-)d\omega}(10-n_{3d})\left(1 + \frac{7\langle T_z\rangle}{2\langle S_z\rangle}\right)^{-1}$$

Figure 5 A-D

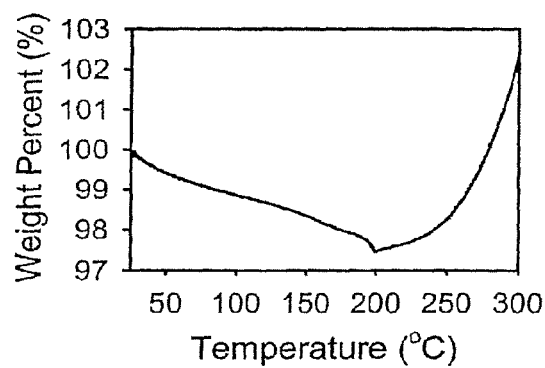
Figure 6
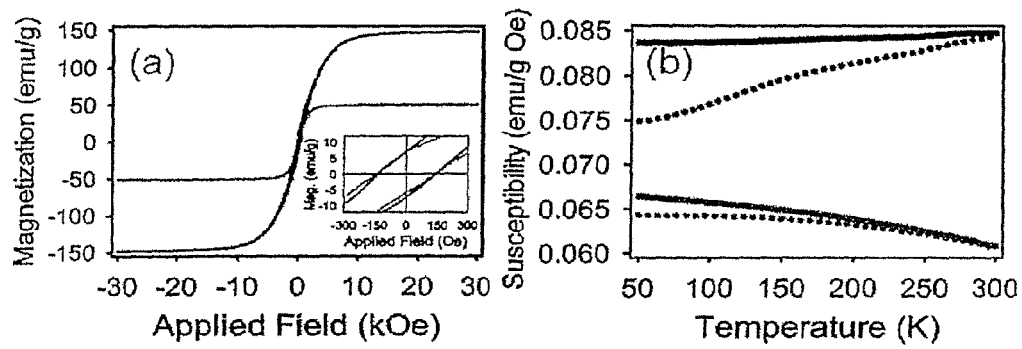
Figure 7A
Figure 7B

NON-RARE EARTH MAGNETIC NANOPARTICLES

STATEMENT OF GOVERNMENT INTEREST

This invention was made with government support under contract number DE-AR0000192 awarded by the Department of Energy. The government has certain rights in the invention.

BACKGROUND OF THE INVENTION

Field of the Invention

The invention generally relates to magnetic alloy non-rare earth nanoparticles, magnets made therefrom, and methods of making the same. In particular, the non-rare earth magnetic nanoparticles are single phase materials and are made using a continuous flow process.

Background of the Invention

Permanent magnets (PMs), specifically those containing rare earth metals, are an indispensible component of many applications in electric, electronics, communications, and automobile industries. The emergence of green technology markets such as plug-in hybrid/electric vehicles (e.g. PHEVs and EVs), direct drive wind turbine power systems, and energy storage systems (e.g. flywheels) has created an increased demand for PMs, since they produce high torque with a much smaller motor.

The majority of the cost for producing electric motors is directly related to the magnetic materials used therein, particularly the rare earth metals that are currently used to produce PMs. Unfortunately, recent market trends have made the production and procurement of rare earth permanent magnets more challenging and less cost efficient. The lack of a secure supply chain for rare earth metals makes them very expensive. If electric motors are to achieve prominent integration into green technologies and be affordable for the average consumer, it will be essential to reduce the cost of the materials. Unfortunately, there are currently no existing alternatives to rare earth metals for producing energetically equivalent PMs. There is thus a pressing need in the art to identify new materials to replace rare earth metals in the manufacture of PMs, as well as efficient, cost effective methods of manufacturing PMs using such materials.

The production of non-rare earth cobalt magnetic nanoparticles using a wet chemical polyol process has been described, e.g. see published United States patent application 2012/0168670 (Harris), the entire contents of which is hereby incorporated by reference. However, this publication describes only a mixture or admixture of magnetic $Co_2C$ and $Co_3C$ phase cobalt carbides nanoparticles and a method for the scalable manufacturing of those particles.

U.S. Pat. Nos. 5,783,263; 5,549,973; and 5,456,986 (Majetich et al., the entire contents of each of which is hereby incorporated by reference) describe metal carbide nanoparticles. However, the particles are coated and their manufacture is tied exclusively to a particular process that involves preparing graphite rods which are packed with a magnetic metal oxide.

The prior art has thus far failed to provide alloy non-rare earth nanoparticles and methods to make the same in quantities sufficient to be practical for manufacturing purposes.

SUMMARY OF THE INVENTION

Provided are novel single phase magnetic alloy non-rare earth nanoparticles, magnets made therefrom, and methods of making the same in quantities sufficient to be practical for use in manufacturing. The magnetic nanoparticles do not contain any rare-earth metals, and, in some embodiments, they are pure single phase materials. The nanoparticles are advantageously made using continuous flow synthesis systems and methods which produce significantly more nanoparticulate material than do prior art systems and methods. In exemplary embodiments, the continuous flow systems use a polyol synthetic process and/or synthetic processes that employ supercritical liquids. The magnetic metallic materials produced as described herein include, or are used to make, both soft and hard magnets.

Provided herein are single phase magnetic alloy nanoparticles. In some embodiments, the single phase magnetic alloy nanoparticles are comprised of a material selected from the group consisting of: $Co_2C$, $Co_3C$, $Fe_3C$, $Fe_5C_2$, and $Fe_7C_3$. In some embodiments, the single phase magnetic alloy nanoparticles do not contain rare earth metals.

Also provided are methods of synthesizing single phase magnetic alloy nanoparticles, the methods comprising steps such as i) introducing one or more fluid solutions comprising a salt of a magnetic metal into a continuous flow microfluidic reactor; ii) subjecting the one or more solutions to reaction conditions which allow the salt of a magnetic metal to form single phase magnetic alloy nanoparticles; and iii) recovering the single phase magnetic alloy nanoparticles by subjecting them to a magnetic force. In some embodiments, one fluid solution is introduced into the continuous flow microfluidic reactor and the reaction conditions include maintaining the fluid solution at a pressure and temperature sufficient to convert the fluid solution to a supercritical fluid (SCF). This embodiment may further comprise a step of releasing the pressure from the SCF in order to cause flash evaporation of the SCF, which leaves behind the nanoparticles. The step of releasing may be carried out prior to a step of collecting the nanoparticles. The method may also include a step of collecting and/or purifying the single phase magnetic alloy nanoparticles after the flash evaporation of SCF, e.g. using a magnetic separating device. In other embodiments, the salt of a magnetic metal is contained in one of two fluid solutions that are introduced into the continuous flow microfluidic reactor, and the method includes a step of mixing the two fluid solutions. The step of mixing is carried out at a temperature and pH and for a period of time sufficient to permit said salt of a magnetic metal to react with other components of the solutions and to form the single phase magnetic alloy non-rare earth nanoparticles.

In yet other embodiments, systems for synthesizing single phase magnetic alloy nanoparticles are provided. The systems comprise, for example: i) a continuous flow reactor; ii) a controller to control conditions within the continuous flow reactor; and iii) a magnetic separation device configured to subject the single phase magnetic alloy nanoparticles to a magnetic field.

BRIEF DESCRIPTION OF THE DRAWINGS

FIG. 6. XRD scans for Ni (top), and Co (bottom) particles collected after 2.5 hr. reaction time. Reitveld refinement fitted profiles for the Ni Co are superimposed. Miller indices for the FCC-phases and HCP—Co phase are indicated.

FIG. 7A-D. TEM images of (a,b) nickel particles, and (c,d) cobalt particles. Inset shows FFT calculated lattice spacing.

FIG. 6. Thermogravimetric curve for synthesized Co particles.

FIGS. 7A and B. (a) Room temperature magnetization vs. applied field curves for synthesized cobalt (black) and nickel (gray) particles. (b) Zero field cooled (dotted) and field cooled (solid) magnetization vs. temperature for cobalt (black) and nickel (gray) particles collected at 250 Oe.

DETAILED DESCRIPTION

Figure 1:
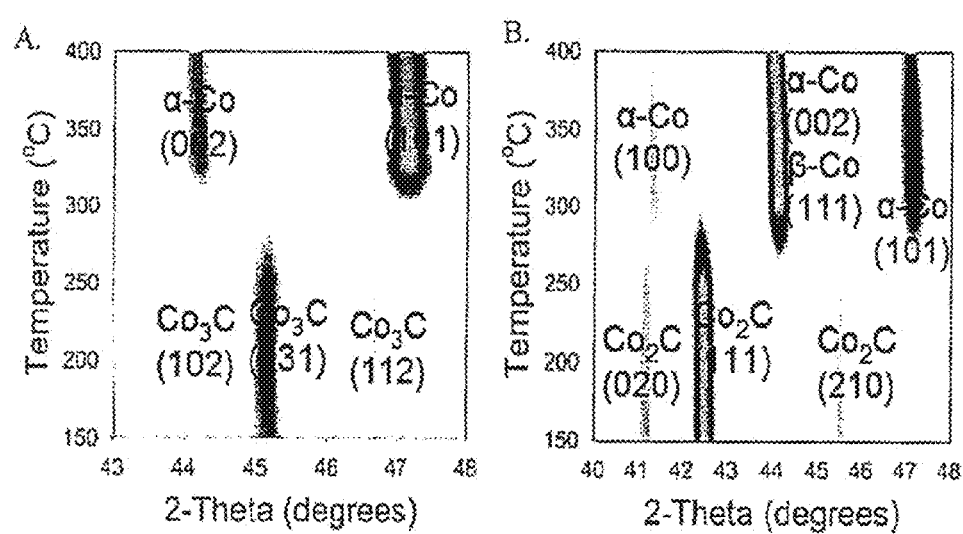
FIGS. 1A and B. ETXRD scans of $Co_2C$ (A) and $Co_3C$ (B) with $Co_xC$ and Co phases identified. (α=HC—Co, β=FCC—Co) $Co_2C$ is the only phase present up to 250° C. At 250° C., the $Co_2C$ (111) peak shifts to a lower angle, while the (020) peak of Co2C shifts to the (100) peak of α-cobalt. The (111) peak of $Co_2C$ is present till 350° C. At 375° C. the α-cobalt phase transitions to the β-cobalt phase. $Co_3C$ was the major crystal phase up to 300° C. Also at 275° C. a low intensity for the α-cobalt (101) peak is noticed. Above 300° C. the $Co_3C$ phase transitions to α-cobalt. At this transition, the (210) peak of Co₃C shifts to the (002) peak of α-cobalt and the Co₃C (211) peak evolves to the (101) peak of α-cobalt.

Magnetic alloy non-rare earth nanoparticulate material (nanoparticles) are provided, the nanoparticles being made by a continuous flow process, which results in a pure, single phase material. The nanoparticles comprise non-rare earth metals and/or alloys of non-rare earth metals. In other words, the nanoparticles do not contain rare earth metals, rare earth metals are absent from the nanoparticles, and the percentage or content of rare earth metals in the nanoparticles is zero, i.e. they are rare-earth free. Such nanoparticles may be referred to herein as "single-phase magnetic alloy nanoparticles, "magnetic alloy nanoparticulate materials", "magnetic non-rare earth nanoparticles", "magnetic nanoparticles of the invention", "metal nanoparticles", "nanoparticles", etc. Magnets made with the non-rare earth magnetic nanoparticles (which may be either hard or soft magnets) may be referred to as "non-rare earth magnets", "non-rare earth permanent ('hard') magnets", "non-rare earth soft magnets", etc., or by other equivalent terms or phrases.

The following definitions are used throughout:

Coercivity: In materials science, the coercivity (coercive field, coercive force) of a ferromagnetic material is the intensity of the applied magnetic field required to reduce the magnetization of that material to zero after the magnetization of the sample has been driven to saturation. Thus, coercivity measures the resistance of a ferromagnetic material to becoming demagnetized.

Alloy: a material in which two or more elements are combined in a single crystal structure. The crystal structure maybe the same as that of the constituents, or may be different from that of the constituents. In exemplary embodiments, the alloys are metal alloys.

Nanoparticle: ultrafine particles sized between 1 and 1000 nanometers. "Sized" generally refers to the smallest dimension of the particle, e.g. diameter if the particle is substantially spherical and/or contains circular arcs; or length, width, etc. if the particle is angular, e.g. such as a crystal.

Permanent ("hard") magnet: an object made from a material that is magnetized (magnetic, ferromagnetic material) and creates its own persistent magnetic field. Ferromagnetic materials can be divided into magnetically "soft" materials which can be magnetized but do not tend to stay magnetized, and magnetically "hard" materials, which do. Permanent magnets are made from "hard" ferromagnetic materials that are subjected to special processing in a powerful magnetic field during manufacture, to align their internal microcrystalline structure, making them very hard to demagnetize. To demagnetize a saturated magnet, a certain magnetic field must be applied, and this threshold depends on the coercivity of the respective material. "Hard" materials have high coercivity e.g. typically greater than 1000 Am$^{-1}$.

Rare earth metals: the fifteen lanthanides (lanthanum, cerium, praseodynium, neodymium, promethium, samarium, europium, gadolinium, terbium, dysprosium, holmium, erbium, thulium, ytterbium, lutetium) plus scandium and yttrium.

Single or pure phase: Any material which consists of at least 95% of a single crystallographic phase as determined by X-ray diffractions.

Soft magnet: Soft magnets hold their magnetic abilities only temporarily and are easily magnetized by exposing them to electrical current and demagnetized by removing the electrical current. These magnets are regulated by the flow of current, and control of their magnetization and demagnetization is vital to ensure the reliability of the devices that rely on them. Soft magnets are found in many devices (MP3 players, computers, transformers, relays, inductors etc. and other devices in which current alternates frequently. Soft magnets typically have intrinsic coercivity less than 1000 Am$^{-1}$. They may be formed from e.g. amorphous nanocrysatlline alloys of iron, nickel and/or cobalt with one or more of the following elements: boron, carbon, phosphorous and silicon; or from soft ferrites which are ferrimagnetic with a cubic crystal structure and the general composition MO.Fe₂O₃, where M is a transition metal such as nickel, manganese or zinc; from nickel-iron alloys (permalloys) with a wide range of compositions, e.g. from 30 to 80 wt % Ni.

Supercritical fluid: a substance that is at a temperature and pressure above its critical point. The "critical point" ("vapor-liquid critical point" or "critical state") of a substance occurs under conditions such as specific values of temperature, pressure or composition at which no phase boundaries exist, for example, where distinct liquid and gas or vapor phases do not exist. Under such conditions, a substance can have properties of both gases and liquids, e.g. the ability to effuse through solids like a gas and dissolve materials like a liquid. At or close to the critical point of a substance, small changes in pressure or temperature can result in large changes in density, allowing many properties of a supercritical fluid to be "fine-tuned".

Continuous Flow Synthesis of Nanoparticles

In continuous flow methods, one or more solutions which contain some or all of the reactants required for a desired chemical synthetic reaction to occur are provided. The one or more solutions are then introduced into a continuous flow device and subjected to a change in conditions. The change causes or allows the desired chemical reaction to proceed. For example, if a single (only one) solution is used, the solution is introduced into the device and one or more parameters (e.g. temperature, pressure, etc.) are altered and/or manipulated upon entry or thereafter to cause the desired reaction to take place. If two or more solutions are used, each of the solutions may be different and may contain a subset of the reactants needed to conduct the desired reaction, and/or to make the reaction move forward in a desired manner, or at a desired rate, etc. Upon introduction into the continuous flow device, the solutions mix and reaction is initiated under controlled and/or optimized conditions. For example, the solvents, the concentrations of reactants in each solution, the pH, etc. of the at least two solutions can be precisely and separately controlled; the rate at which the two or more solutions mix (e.g. the rate of entry or the flow rate of each solution into a common mixing chamber) can also be controlled, as can the temperature, pressure, residence time in the reactor, and other conditions of flow and mixing.

If two or more solutions are employed, generally a first solution is provided in which one or more metal salts is/are dissolved in a solvent and a second solution containing the same or another suitable solvent without the metal salt(s) but with other active ingredients, is also provided. The two solutions are initially housed in separate chambers or containers (reservoirs, etc.), and are drawn into a common mixing chamber e.g. by pumping. Generally, a means for stirring or agitating the solutions as they mix is provided, e.g. within a mixing chamber itself, or at a junction of the two flow paths located just outside the mixing chamber (although in some embodiments, the flow rate may be sufficiently high to cause adequate mixing of the two solutions at the point where they encounter each other). The mixing chamber may include a heating source. The flow rate and/or the volume of the mixing chamber may be adjusted so as to provide a suitable residence time of the reactants within the mixing chamber so that the conversion of metal salts in solution to solid nanoparticles can proceed to completion, or to near completion e.g. at least about 50, 55, 60, 65, 70, 75, 80, 85, 90, or 95% or more completion. Typical mean residence times are in the range of from about 0 to about 20 minutes, e.g. about 1, 2, 3, 4, 5, 6, 7, 8, 9 or 10 minutes, or more (e.g. about 11, 12, 13, 14, 15, 16, 17, 18, 19 or 20 minutes).

In some embodiments (e.g. in a microfluidic reactor) the mixing chamber is a channel comprised of e.g. tubing, which may be straight or coiled but is typically sinuous, and which is generally placed on a support member. In other embodiments, the mixing chamber may be a single container of sufficient volume to receive the solution(s) and house the reaction mixture.

As the reaction progresses within the mixing chamber, metallic nanoparticles are formed and are released and/or collected by any of several methods. For example, the reaction may be stopped and the particles may be collected or separated from the reaction liquid e.g. by gravity, filtering, by centrifugation, magnetic separation, spray drying, sedimentation, sieving, etc. Alternatively, the particles may be continually removed from the reaction chamber or continually sequestered in a particular location within the reaction chamber as the reaction proceeds, e.g. by trapping them with a filter or screen, by magnetic attraction, etc, Separation of the nanoparticles from other solids in the reaction mixture may be accomplished e.g. using centrifugal techniques, using magnets, by sieving according to size, etc.

Unreacted or spent reaction liquid, which contains lower levels of metal salts than when introduced into the mixing chamber, may be removed from the system or may be recycled back in to the reactor.

Prior art microfluidic reactors are described, for example, in U.S. Pat. No. 7,615,169 (Strouse et al.) and US patent application 20100184928 (Kumacheva), the complete contents of both of which are hereby incorporated by reference. In some embodiments, these or similar continuous flow reactors may be used in the methods. However, in other embodiments, the continuous flow reactors that are employed have novel features that are designed to facilitate or optimize reactions, yields, etc. of alloy magnetic nanoparticles as described herein.

Figure 8:
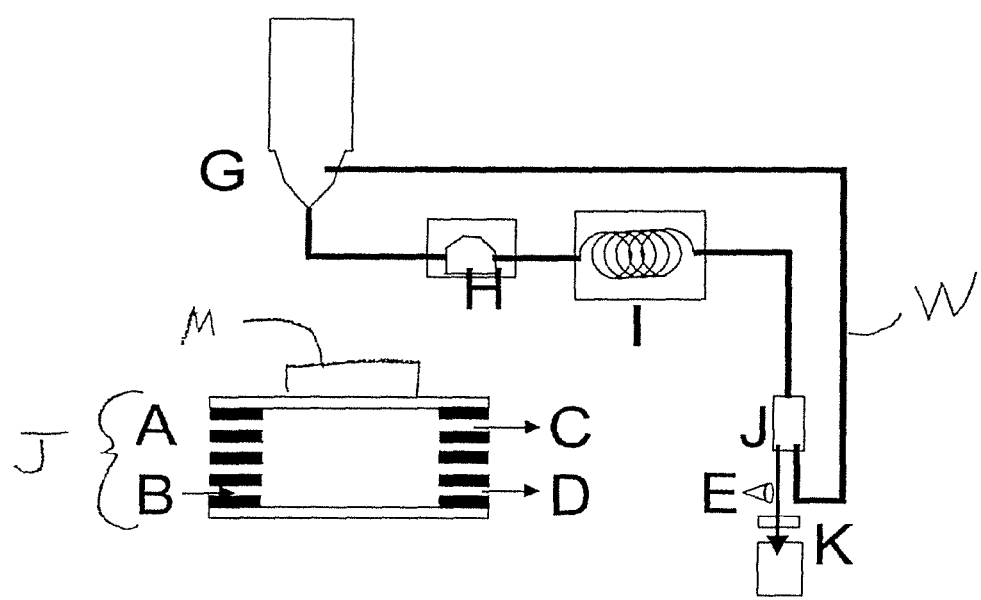
FIG. 8. Schematic representation of a continuous flow system with a magnetic separator.

In some embodiments, the invention also provides a continuous flow system for carrying out the methods described herein. A schematic representation of an exemplary system is presented in FIG. 8. In FIG. 8, G is a reaction hopper (chamber, reservoir) which contains a metal salt dissolved in a solvent such as ethanol. H is a high pressure pump, I is a capillary microreactor which is heated to a desired temperature, J is a separator (shown in detail below the system), (e.g. a photodiode, magnetoresistance, hall probe, etc.) that detects (monitors) the particles and provides feedback to adjust the pump rate, temp etc., and K is a receptacle which receives the desired product. A-D represent the magnetic separator J which. A is a wash solvent, B is a reaction mixture, C is the desired product, and D is a waste stream. Magnet M is placed on the A-C side of the separator. The magnet pulls on and influences the flow path of magnetic particles, and the amount (strength) of the magnetic force determines which channel (e.g. top or bottom) metal particles enter when leaving the separator. For example, metal particles deflected toward the magnet are likely to enter the top channel and flow past detector E and into receptacle K. In contrast, unreacted liquid and waste components are not deflected, or are deflected to a lesser extent, and are likely to flow through the bottom channel upon egress from separator J, entering e.g. line (conduit, channel) W. In the embodiment shown in FIG. 8, the waste stream is recycled back into the reaction. This exemplary system can be readily adapted to a variety of continuous flow synthetic processes.

Generally, the system also includes a controller that controls (e.g. initiates, adjusts, and/or monitors, etc.) the conditions within the reactor, e.g. the temperature, pH, time of mixing, residence time, pressure, flow rates, mixing speed, volumes, etc. The controller is generally a computer that has been programmed to carry out instructions needed to implement the method steps, and/or to receive input from a human and from the various components of the system, and to provide output to the various components of the system and/or to a display device, as well as to monitor input on an ongoing basis. The computer is also generally programmed to conduct relevant processing, e.g. various calculations of data, etc. The instructions may reside on a non-transient medium such as a CD, DVD, flash drive, a hand held device, etc. and/or may be downloadable via the interest. Output from the controller may be displayed, e.g. on a computer monitor or other display screen, and/or may be printed out and provided as a hard copy.

Adaptation of Batch Synthetic Processes to Continuous Flow

In some embodiments of the invention, a scalable wet chemical batch technique is adapted for use in continuous flow. The method used typically involves nucleation of one or more types of metal ions e.g. on a "scaffolding" or support provided by a reactant, followed by a growth phase of the metal on the scaffolding or support to form alloy nanoparticles. Depending on the solvent components that are utilized, the resulting nanoparticles may be, for example, carbides, nitrides, borides, phosphides, or sulfides or a mixture of these. Such particles demonstrate properties not found in the original bulk materials.

In one embodiment, the wet chemical technique is a polyol process in which a polyhydric alcohol (polyol) is base deprotonated to a glycolate which promotes reduction and nucleation of the metal salt, especially under high temperatures. The polyol functions as a solvent and reducing agent whereby a metal precursor is reduced to form metal nuclei attached to the glycolate. The nuclei grow on the glycolate through a traditional Ostwald ripening mechanism. The reaction is thus carried out under conditions which in effect allow ligand exchange to occur between the deprotonated alcohol and a metal salt of interest. At elevated temperatures, excess glycolate ions assist in the reduction of the metal, and also act as a capping agent. By controlling the reaction temperatures, pressures, and alkalinity, the reduction, nucleation, and growth dynamics of the reaction can be controlled to achieve a desired nanoparticle composition.

In some exemplary examples pure $Co_2C$ phase and pure $Co_3C$ phase magnetic nanoparticles are formed in this manner (for details see Example 1). In other exemplary examples $Fe_3C$, $Fe_5C_2$, and $Fe_7C_3$ magnetic nanoparticles are formed (see Example 2).

In addition, it has been found that, with polyol processes, superior results are obtained with respect to nanoparticle yield and purity when the reaction is carried out by the incremental addition of small aliquots of the metal salt to the polyol at spaced apart time intervals, rather than adding the entire amount of metal salt to be reacted all at once to the reaction mixture. Without being bound by theory, it appears that the repeated (repetitive) addition of small amounts of the metal salt slows the growth of the material. Slowing growth may be key to forming the carbide phases with desired phase composition, size, and shape. The gradual addition of the metal salt allows sufficient time for reconstruction and/or diffusion of C atoms into the Co structure and the formation of the desired material, without impurities. Continuous flow methods are thus well-suited to such synthetic processes.

Polyol based synthesis of such nanoparticles typically involves the mixing of a polyol with at least one metal salt of interest. In some embodiments, a single type of metal salt is used. In other embodiments, two or more types of metal salts are used, resulting in production of nanoparticles with mixed metal compositions. Suitable polyols for use in the methods include but are not limited to, for example, various alcohols which have between 1 and 20 carbons, various di- or tri-alcohols; ethers with a terminal alcohol, and others.

Metals that may be employed include but are not limited to, for example, cobalt, iron, nickel, manganese, chromium, or their alloys. The metals are generally in the form of a salt formed with anions such as e.g. $CH_3COO^-$, $CO_3^{2-}$, $Cl^-$, $F^-$, $HOC(COO^-)$, $(CH_2COO^-)_2$, $C\equiv N^-$, $NO_3^-$, $NO_2^-$, $PO_4^{3-}$, and $SO_4^{2-}$, or organometallics like CO or $C_6H_5$. Metal alloys may also be used, examples of which include but are not limited to: CoNi, CoFe, NiFe, MnFe, CoNiFe, CoMnFe, etc In yet other embodiments, one or more surfactants are included in one or both of the solvents. Exemplary solvents that may be used include but are not limited to: bis(2-ethylhexyl)sodium sulfosuccinate (AOT)-isooctane, nonylphenyl polyethoxylates such as Igepal Co430™; polyvinyl alcohols such as polyvinylpyrrolidine (PVP), cetyltrimethylammonium bromide, and polyethylene glycols (PEGs)

Conditions for carrying out the reaction may vary depending on the metal(s) or alloys thereof that are used to form the nanoparticles. For cobalt-based nanoparticles, the $[OH^-]$ may be low (e.g. in the range of from about 0 to about 0.1M and usually from about 0 to about 0.05M to bias the reaction toward $Co_3C$, or may be high (e.g. in the range of from about 0.2 to about 1M and usually from about 0.3 to about 0.6) to bias the reaction toward $Co_2C$. For other metals, conditions are adjusted to achieve a desired level of polyol deprotonation, the desired level being that which permits the reaction to proceed at a suitable rate. For example $Ni_3C$ can be synthesized at $[OH^-]$ in the range of 0M to 0.4M and usually from 0.14M to about 0.2M. Levels may be adjusted, e.g. by adjusting the pH of the reaction mixture by sodium or potassium hydroxide or sodium ethoxides, other suitable pH altering agents. For cobalt-based nanoparticles, the $[Co^{+2}]$ may be wide (e.g. in the range of from about 0.0001M to the solubility limit, and is usually from about 0.01 to about 0.1) to bias the reaction toward $Co_3C$, or may be low (e.g. in the range of from about 0.5 mM to about 2 mM, and usually from about 1 mM to about 1.5 mM) to bias the reaction toward $Co_2C$.

In addition, the rate of mixing the metal salt with the polyol is adjusted to provide a desirable reaction rate. Generally, the metal salt is added at a rate of from about 0.2 to about 0.4 mmoles per mL of glycol every 1 to 2 minutes.

The reaction may be carried out at a wide range of suitable temperatures, e.g. in the range of from about 180° C. to about 325° C., and usually from about 250° C. to about 325° C., depending on e.g. the desired rate of reaction, the reactants that are employed, and the products that are desired etc.

Continuous Flow Synthesis of Nanoparticles Using Supercritical Fluids

In some embodiments, the continuous flow synthesis methods are carried out or performed using supercritical fluids (SCFs). The use of supercritical solvents in the continuous flow processes of the invention allows not only the efficient synthesis of nanoparticles, but also advantageously permits the rapid separation of the nanoparticles from the reaction mixture once the applied pressure is released.

Generally, the synthetic methods are carried out as described for continuous flow reactions above, except that the continuous flow system is pressurized during the reaction that forms the nanoparticles. Basically, instead of conducting the reaction in e.g. ethanol at low pressures in a manner similar to the polyol synthesis described above, the pressure is increased sufficiently to convert the ethanol to a SCF. Upon completion of the reaction, release of the pressure results in rapid evaporation of the SCF, leaving behind a dry powder that is or contains the alloy nanoparticles. In other words, the SCF flash vaporizes leaving a dry powder behind.

In some embodiments, the supercritical fluids that are used include: alcohols, examples of which include but are not limited to: ethanol, propanol, butanol, ethoxyethanol, etc.; various glycols such as those listed above; liquid carbon dioxide; and acetonitrile, etc. Basically, any liquid in which a metal salt of interest can be dissolved and which becomes a SCF under pressures that are attainable in a continuous flow reactor, may be used. Preferably, such reagents are advantageously inexpensive, and can also be easily recaptured upon removal from the reaction mix, allowing them to be reused. This further decreases the cost of manufacturing the nanoparticles and provides environmental advantages since waste disposal is minimized.

Metals which may be used include those listed above in the section entitled "Adaptation of Batch Synthetic Processes to Continuous Flow".

Core-Shell Nanoparticles

In some embodiments, the nanoparticles that are synthesized as described herein are core-shell nanoparticles. Core-shell nanoparticles are structured nanoparticles that comprise a core of one material and a coating shell of another material. The core can be e.g. from about 1-100 nm in diameter with a shell from e.g. about 1 to 100 nm thick. In one embodiment, the core-shell particles are iron/iron oxide particles, i.e. the surface of the particles is oxidized and thus the particles are coated with iron oxide.

The continuous flow microfluidic reactor of the invention is particularly well suited to provide substantial quantities of nanoparticles of this type in order to make commercialization possible.

Exemplary Applications of the Technology

The magnetic nanomaterials of the invention may be used in many applications, including without limitation the fabrication of permanent magnets. In one embodiment, the invention thus provides permanent magnets formed from (i.e. which include or incorporate) the magnetic nanoparticles described herein, i.e. permanent magnets that do not contain rare earth metals (they are "non-rare earth" permanent magnets) and may be used in many different ways. For example, they may be incorporated into electric motors (e.g. in plug-in hybrid or other electric vehicles), direct drive wind turbine power systems, various energy storage systems (e.g. flywheels), magnetic recording media (e.g. hard drives, floppy disks, magnetic tapes, etc.), magnetic separation devices, and also in other products e.g. in toys, as fastening devices, as refrigerator magnets, etc.

In particular, the invention provides electric motors which include permanent magnets of the invention. The electric motors may be used for any of a variety of applications.

In other embodiments, the invention provides soft magnets. The soft magnets of the invention may be used in any suitable device or for any suitable application.

EXAMPLES

Example 1. Non Rare Earth High Performance Permanent Magnets Via Solution-Processed Assembly of Exchange Coupled Cobalt Carbide Nanoparticles Rare earth permanent magnets have a high-impact on clean technology applications such as wind turbines and electric vehicle motors.[1] However, due to the restricted accessibility of imports of rare earth commodities to the United States rare earth permanent magnets are becoming increasingly expensive to manufacture. Alternative sources, such as rare earth free permanent magnets, with similar or enhanced energy products are becoming a subject of intense research.[1,2] Recently, mixed phase cobalt carbide nanoparticles were shown to possess enhanced magnetic properties, and due to the lack of rare earth elements, are very attractive for their use in clean-energy technologies.[3,4] However, to fully optimize the magnetic performance, a better understanding and control of the phases which compose the nanoparticles are still needed. Here we report the synthesis and characterization of pure phase $Co_3C$ and $Co_2C$ nanoparticles processed via a wet chemical technique. By studying the magnetic and thermal properties a detailed understanding of the formation mechanics and origin of the magnetic properties was elucidated. Determining the effects each phase has on the magnetic properties will lead to state-of-the-art permanent magnets by effectively enhancing their energy product to rival that of current technologies.

Permanent magnets are a key component in many energy related applications, where an increase in the magnetic energy density of the magnet, typically presented via the maximum energy product $(BH)_{max}$, increases the efficiency of the whole device (for example the volume-to-power ratio of an electric motor). Since the development of rare earth permanent magnets in the 1960's and 1970's there have been slight advances in the $(BH)_{max}$ achieved by varying the synthetic processing and the ability to control the anisotropy. However, the discovery of novel materials with enhanced energy products has been limited.[1,2] The last major advance in non-rare earth permanent magnets dates back to the mid 1930's with the development of AlNiCo magnets and since then only slight changes in the $(BH)_{max}$ have been reported.[2] The recent discovery of cobalt carbide nanoparticles has opened the door to a new class of non-rare earth permanent magnet materials that has potential to out perform AlNiCo and even that of the best rare earth permanent magnets. The synthesis of $Co_xC$ nanoparticles is accomplished using a wet chemical technique, the polyol process, where a cobalt precursor salt is dissolved in a polyhydric alcohol (polyol) and heated to elevated temperatures (250-325° C.), near the boiling point of the solvent. At these elevated temperatures the polyol is at its highest reactivity and acts as solvent, capping agent, and reducing agent. Using this wet chemical approach, it is possible to tailor the magnetic properties to produce phase pure carbides thereby creating new high-energy product permanent magnet.

In a typical reaction, potassium hydroxide is dissolved in tetraethylene glycol (TEG) and heated to 275° C. Once the solution reaches temperature, the cobalt salt is added to the hot solution in ten increments over 20 minutes. In experiments using a singular addition of cobalt salt, the resulting particles were a composite of metallic cobalt and cobalt carbide phases. The incremental addition of the cobalt salt dramatically attenuates the growth steps allowing for the incorporation of carbon into the cobalt structure and results in the formation of pure carbide phase nanoparticles. The intricate control in the formation of phase pure $Co_2C$ and $Co_3C$ carbide is accomplished by varying the hydroxide concentration in the TEG solution. In a basic environment, the polyol will polymerize via a condensation reaction producing polyethylene glycol (PEG) of varying chain lengths. Increasing the hydroxide concentration increases the PEG chain length resulting in variations in the nucleation dynamics, which generates either form of the cobalt nuclei (α-Co or β-Co). At low hydroxide concentrations, the kinetic product α-Co (hexagonal closed packed, HCP) is formed upon nucleation, while higher concentrations form the thermodynamic product β-Co (face-centered cubic, FCC).[5,6] The initial structure of the nucleated cobalt then determines the final carbide phase formation; α-Co forms $Co_3C$ while a mixture of α-Co and β-Co forms $Co_2C$. According to x-ray diffraction data and structural refinement, the calculated lattice parameters of the $Co_2C$ sample are a=4.45 Å, b=4.37 Å, and c=2.90 Å (space group Pnnm) while the lattice parameters of $Co_3C$ are a=5.02 Å, b=6.73 Å, and c=4.44 Å (space group Pnma) (XRD scans can be seen in the supporting information, S1). These lattice parameters are consistent with lattice parameters of bulk $Co_xC$ particles.[7]

Elevated Temperature X-Ray Diffraction (ETXRD) further supported this correlation between the metallic structure and carbide phase (FIG. 1). Initially, as the temperature increases from 25° C. to 250° C., the carbon rich $Co_2C$ decomposes creating a mixture of both α and β-Co. With the $Co_3C$, there is a reduced carbon content which results in a higher decomposition temperature at 325° C. Since there is less disruption to the carbide lattice only the α-Co is formed. While the relationship between metallic cobalt and carbide phases is interesting, it alone does very little to aid in the elucidation of the formation mechanism of the cobalt carbide system.

While few studies have addressed the formation of cobalt carbide nanoparticles, the formation of nickel carbides during nickel catalyzed Fisher-Tropsch synthesis has been extensively studied. Nickel crystallizes into similar metal and carbide allotropes as cobalt, so the formation of nickel carbides could be extended to the cobalt carbide system. At the elevated temperatures of the TEG, carbidization tends to occur according to a carbide cycle similar to ones reported with Fischer-Tropsch catalysts.[8-12] As the metallic cobalt nanoparticles nucleate, they catalyze the decomposition of the glycolate to form carbon on the surface of the nanoparticles. Due to the presence of these surface carbon atoms, surface diffusion occurs and alters the structure of the metallic cobalt nanoparticles. The formed carbide phase is dependent on the metallic cobalt phase upon nucleation, shown in the ETXRD data, and on the amount of surface carbon.[13] $Co_3C$ is formed from the carbon filling the hollow sites of the α-Co surface. For $Co_2C$, a p4g clock site reconstruction occurs on the α-Co (001) and β-Co (111) planes.[9,14] The increased carbon needed to induce a p4g surface reconstruction is a result of defects from the two phase particle system seen in the ETXRD study.[13] While the carbon only diffuses into the surface layers, due to the attenuated growth rate resulting from the iterative additions, the carbon is continuously incorporated resulting in the complete conversion to the carbide. When the cobalt precursor is introduced instantaneously, the cobalt undergoes rapid growth. Since the carbon formation is slower than the cobalt growth, a multi-phase metallic/carbide particle is formed. However, by adding the cobalt precursor iteratively the growth occurs in stages, which allows for the complete incorporation of the carbon creating a pure carbide phase.

Figure 2:
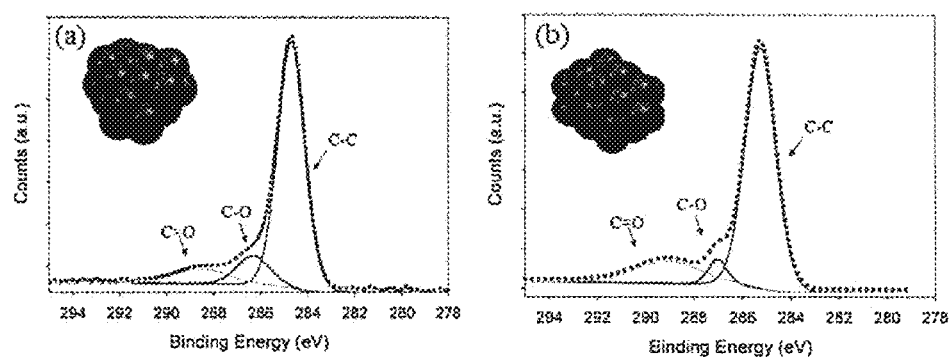
FIGS. 2A and B. XPS C 1s scans of as prepared (a) Co₃C and (b) Co₂C nanoparticles. Inset in each scan is a space filled model of each carbide phase, modeled from collected XRD scans with cobalt shown in black and carbon in gray.

In previous reports on the synthesis of cobalt carbide, the carbon is identified as a graphitic carbon layer on the metallic nanoparticle.[15-18] In this study, X-ray photoelectron spectroscopy probed the surface of the carbide particles, in order to determine the structure of the surface carbons. The Carbon C 1s scan of $Co_3C$ and $Co_2C$ shown in FIG. 2(a,b) shows 3 carbon species: C=O at 288.5 eV, C—O at 286.3 eV, and C—C at 284.7 eV. The C—O and C=O species imply the presence of glycolate on the surface.[19] Comparing the two phases, $Co_2C$ has a higher ratio of C=O due to oxidation of the glycolate at higher pH. Interestingly, no carbide carbon was identified in the XPS scans of $Co_3C$ or $Co_2C$.[9,11] Although, when looking at the space filled models in FIG. 2 (inset) the carbide carbon is present in low amounts on the surface of both $Co_3C$ and $Co_2C$. A low concentration of surface carbon, coupled with the glycolate layer explains the inability to definitively identify the carbide carbon. Also XPS studies of deactivated cobalt based Fischer-Tropsch catalysts identify large amounts of fragmented hydrocarbons and adsorbed C—O species. The carbide carbon is only seen upon removal of the surface carbons by reduction in $H_2$.[10]

Figure 3:
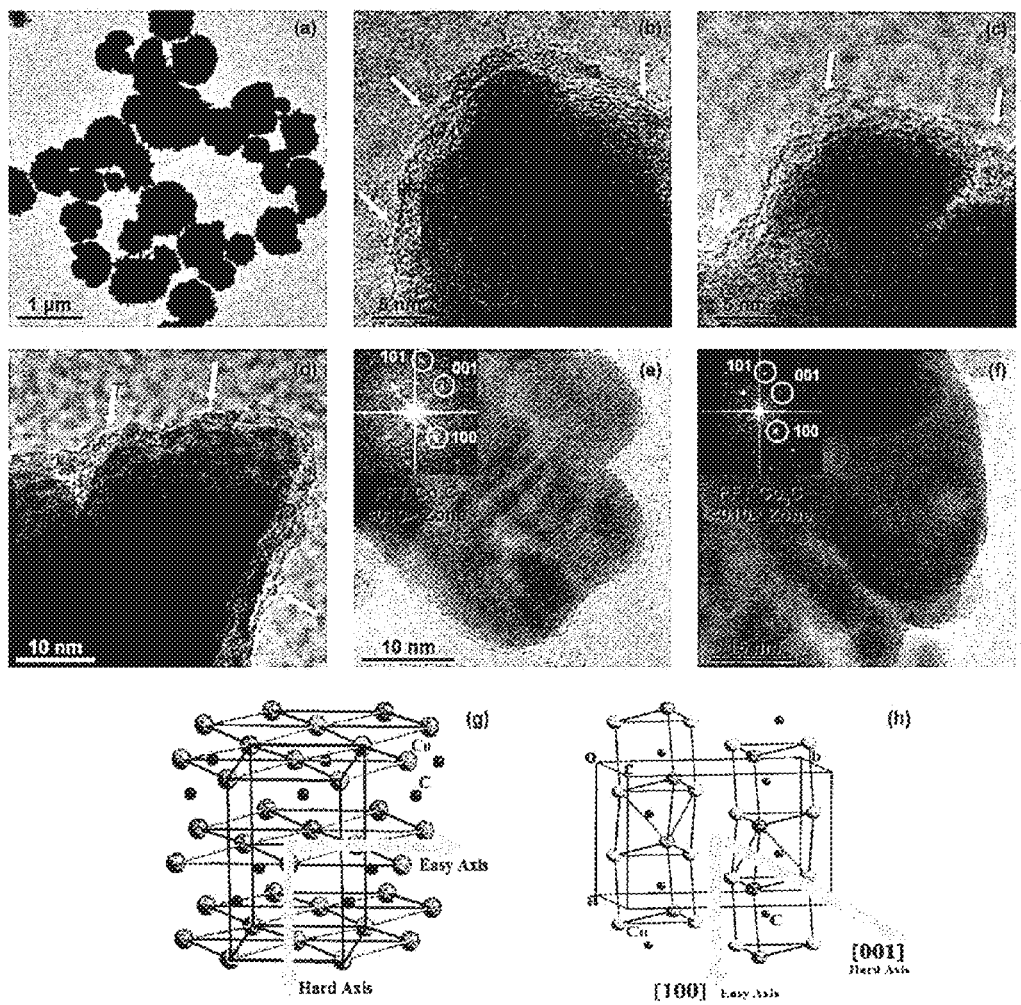
FIG. 3A-H. Bright Field TEM images of (a) Co₃C particles, (b-d) Co₃C particle surface showing the presence of a gylcolate layer and fine crystallites, both indicated by arrows, (e-f) HRTEM of Co₃C particles showing glycolate layer and inset FFT corresponding to Co₃C <010> zone axis, (g) Co₂C and (h) Co₃C crystal structures (where gray dots represent cobalt atoms and black dots represent carbon atoms) showing the hard and easy magnetization axis.

Synthesized $Co_2C$ and $Co_3C$ particles possess an average particle diameter around 300 nm (FIG. 3(a)). The $Co_2C$ and $Co_3C$ particles both possess a spherical shape with similar diameters (FIG. 3(b,c)). High-resolution TEM images of the particle surfaces reveal the presence of a glycolate layer and finer crystallites attached to larger agglomerates (FIG. 3(b-d)). This polycrystalline assembly was also confirmed from SAED and XRD Scherrer analysis. Fourier transforms of the images confirm $Co_3C$ lattice parameters of a=5.05 A and c=4.48 A (FIG. 3(e,f)), commensurate with the values obtained from x-ray diffraction.

Figure 4:
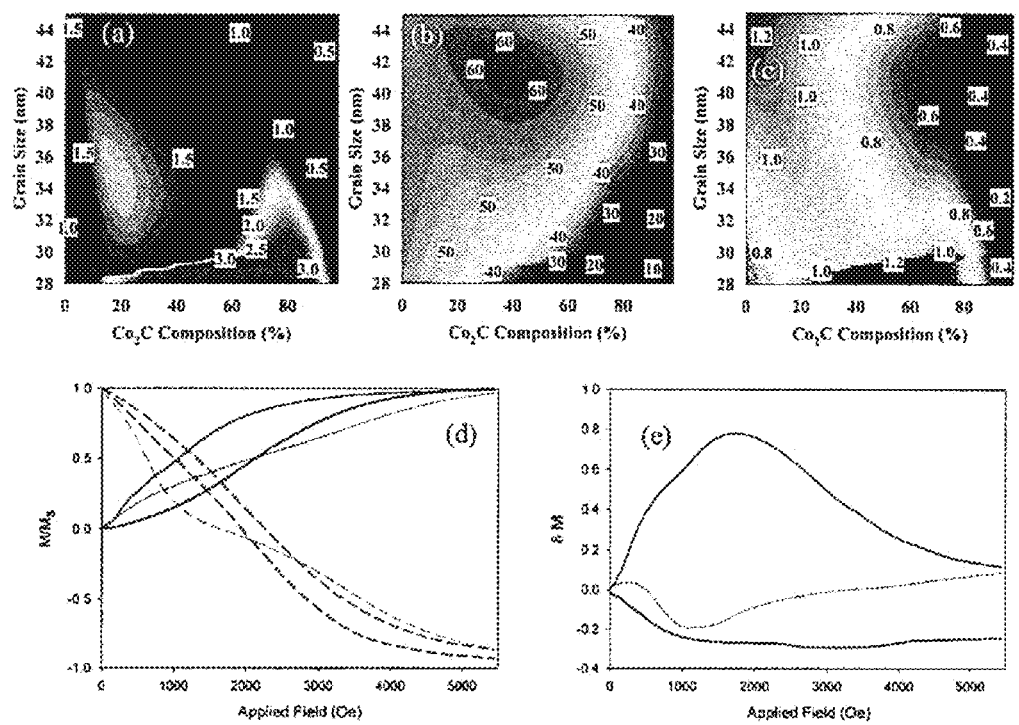
FIG. 4A-E. Contour plots showing relationship of Co₂C composition and Grain Size on (a) Hc in kOe, (b) Ms in emu/g, and (c) BHmax in MGOe. (d) Isothermal Remanent Magnetization (IRM) plots (solid lines) and DC Demagnetization plots (DCD) (dotted lines) of Co₃C, Co₃C rich, and Co₂C rich nanocomposites. (e) Henkel plots derived from the IRM and DCD values using the equation: δM=MDCD-(1-2MIRM). Positive δM values represent exchange coupling to be the dominant magnetic interactions, while a negative δM signify magnetostatic interactions.

With the synthesis of pure phase $Co_2C$ and $Co_3C$, the magnetic properties intrinsic to each phase can be accurately identified. Along with the two pure phases, $Co_xC$ particles consisting of various phase ratios were also characterized. Single phase $Co_2C$ was found to possess a low coercivity (450 Oe) and low magnetization (13 emu/g) while single phase $Co_3C$ showed a high coercivity (1.6 kOe) and high saturation magnetization (55 emu/g) (FIG. 4(a,b)). Single phase $Co_3C$ particles also possessed a higher $(BH)_{max}$ (1.5 MGOe for $Co_3C$ versus 0.1 MGOe for $Co_2C$) (FIG. 4(c)).[1] The high coercivity of the $Co_3C$ can be attributed to magnetostatic interactions (FIG. 4(e)). At low field strengths the magnetic properties of the $Co_3C$ system are dominated by dipole-dipole interactions from superparamagnetic components present. As $Co_2C$ is doped into the system the dipole-dipole interactions are replaced by exchange coupling (FIG. 4(e)). As the $Co_2C$ composition was increased to over 80% the degree of exchange coupling is reduced resulting in a decreased coercivity. Grain size also had an effect on $(BH)_{max}$ values for the $Co_xC$ particles, with lower grain sizes increasing exchange coupling.[20-22]

[1] $BH_{max}$ is calculated as the largest area rectangle formed from the product of magnetization and applied field in the second quadrant of a magnet's hysteresis curve.

First principles theoretical studies examined the magnetic moment and the magneto-crystalline anisotropy energy (MAE) associated with the $Co_2C$ and $Co_3C$ phases. The exact theoretical methods can be found in the methods section. For pure β-Co, the calculated magnetic moment of $1.86\mu_b$ per atom is close to the experimental moment of $1.81\mu_b$. In addition, the theoretical studies indicate that both $Co_2C$ and $Co_3C$ are metallic with moments of $1.0\mu_b$/atom for $Co_2C$ and $1.65\mu_b$/atom for $Co_3C$, respectively. Our findings are in good agreement with the experimentally observed increase in magnetic moment for $Co_3C$ over that of $Co_2C$. Bulk Co is a soft magnetic material (having a low coercivity, below 150 Oe) and our MAE calculations indeed indicate an easy axis along the [100] direction. For the [110] and [111] directions, the studies indicate a MAE per Co atom of 0.0092 and 0.0161 eV/atom respectively. For the $Co_2C$ phase, the easy axis is along the [001] direction and the MAE/atom along [111] is 0.124 eV/$Co_2C$. The $Co_3C$ phase, however, is unique as it has an [100] easy axis but the MAE increases to 0.15-0.19 meV/$Co_3C$ along other directions. The uniaxial anisotropy of the compound contributes to the higher coercivity.

In summary, a modified polyol process was used to synthesize pure phase $Co_2C$ and $Co_3C$ nanoparticles. Through analysis of the carbide phases, a comprehensive understanding of the formation mechanism was developed. For the first time, control of $Co_xC$ phase through hydroxide concentration, as well as other necessary synthetic parameters, is reported. Magnetic characterization and first principles theoretical studies of $Co_3C$ and $Co_2C$ identified the magnetic properties intrinsic to each phase. With the magnetic properties of each carbide phase, now known, it is anticipated that the energy product of $Co_xC$ nanoparticles can be increased by tuning the size and composition of the individual motifs. The low cost of starting materials and high energy products will make the $Co_xC$ nanoparticles an attractive replacement for current permanent magnets in many technology and industrial applications.

Methods

In a typical experiment, tetraethylene glycol (TEG) was stirred, either magnetically or mechanically, and heated to 275° C. with varying amounts of KOH under distillation conditions. Once the solution reached the desired temperature, a total of 10 quantities of $2.0 \times 10^{-4}$ moles of $Co(Ac)_2 \cdot 4H_2O$ were added individually at 2 minute intervals. After the final addition of cobalt precursor, the reaction was kept at temperature for 15 minutes and then cooled for an hour to room temperature. The solution was then centrifuged, rinsed several times, and magnetically separated. Rinsing was done first with ethanol several times, then a 5% $HNO_3$ in ethanol solution was used as the last rinse. The collected particles were then dried in a vacuum oven.

X-ray diffraction (XRD) scans were collected using a Panalytical X'Pert Pro MPD series diffractometer, with Cu Kα radiation (λ=0.154056 Å) in θ-2θ geometry. For elevated temperature X-ray diffraction (ETXRD) an Anton Paar HTK-1200N high temperature camera was used coupled with a TCU-1000 temperature control unit. The ETXRD scans were collected under flowing $N_2$ atmosphere. Sample height was adjusted using a direct beam bisection method at each temperature to correct for thermal expansion. XRD analysis was carried out using X'Pert Highscore Plus software. For determination of grain size the XRD scans were first background corrected. They were then smoothed and FWHM for each peak was determined using the Profit algorithm. The Scherrer equation was then applied using the FWHM of the $Co_2C$ (111) peak and the $Co_3C$ (210) peak. Electron micrograph (TEM) examination was performed with a Zeiss Libra 120 operating at 120 kV and a JEOL 2100 $LaB_6$ operating at 200 kV. TEM samples were prepared by suspending the particles in ethanol and sonicating for five minutes. Small amounts were then pipetted onto ultrathin carbon TEM grids and the solvent was allowed to dry before imaging. Magnetic properties were determined using a Lakeshore VSM with a maximum applied field of 10 kiloOersted (kOe). Isothermal Remanance Magnetization (IRM) and Direct Current Demagnetization (DCD) plots were collected as a function of applied field. For an IRM plot, the magnetization was measured at zero field, then ramped to ΔH, and returned to zero field. The magnetization was then measured and repeated for increasing steps of ΔH. For the DCD plots, the sample was first saturated in negative field and returned to zero field. The magnetization was then measured as was explained for the IRM plot. ΔH for both IRM and DCD plots was 20 Oe. X-ray photoelectron spectroscopy (XPS) was performed on a Thermo Scientific ESCALAB 250 microprobe with a focused monochromatic Al Kα X-ray (1486.6 eV) source and a 180° hemispherical analyzer with a 6-element multichannel detector. The incident X-ray beam was 45° off normal to the sample while the X-ray photoelectron detector was normal to the sample. Angle resolved experiments were conducted at 4° increments from normal until peak intensities reached extinction. The samples were sputtered with gold clusters and binding energies were corrected to the Au 4f peak at 83.95 eV. A large area magnetic lens with a 500 μm spot size in constant analyzer energy (CAE) mode was utilized with a pass energy of 20 eV. Five to twenty scans per region were collected based on sensitivity with step size of 0.100 eV. The powdered samples were pressed onto indium foil and secured to the sample holder using double-sided conductive carbon tape.

First Principles studies were carried out within a density functional framework using the Vienna Ab initio Simulation Package (VASP).[23,24] The projector-augmented wave method was used to model electron-ion interaction and the valence states of Co and C were described by [Ar] $3d^84s^1$, and [He] $2s^22p^2$ electron configurations, respectively.[25] The exchange correlation contributions were incorporated using a hybrid functional B3LYP.[26] We also attempted generalized gradient functional proposed by Perdew, Burke, and Ernzerof in a GGA+U approach with a U value of 4.0 eV to find similar results.[27,28] A plane wave basis with an energy cutoff of 400 eV was used and a Mokhorst-Pack scheme of 5×5×5 division was used to generate the special k-points for constructing the charge density.[29] The magnetocrystalline anisotropy energy (MAE) was calculated using the contribution from spin-orbit coupling. For the $Co_2C$ and $Co_3C$ phases, the structures based on the x-ray diffraction were further optimized. Supplementary calculations were also carried out on bulk Co.

REFERENCES FOR EXAMPLE 1

1 Sugimoto, S. Current status and recent topics of rare-earth permanent magnets. Journal of Physics D-Applied Physics 44, 11, doi:06400110.1088/0022-3727/44/6/064001.
2 Gutfleisch, O. et al. Magnetic Materials and Devices for the 21st Century: Stronger, Lighter, and More Energy Efficient. Adv. Mater. (Weinheim, Ger.) 23, 821-842, doi:10.1002/adma.201002180.
3 Harris, V. G. et al. High coercivity cobalt carbide nanoparticles processed via polyol reaction: a new permanent magnet material. Journal of Physics D-Applied Physics 43, 7, doi:16500310.1088/0022-3727/43/16/165003 (2010).
4 Zhang, Y. et al. Controlled synthesis and magnetic properties of hard magnetic CoxC (x=2, 3) nanocrystals. J. Magn. Magn. Mater. 323, 1495-1500 (2011).
5 Chakroune, N., Viau, G., Ricolleau, C., Fievet-Vincent, F. & Fievet, F. Cobalt-based anisotropic particles prepared by the polyol process. J. Mater. Chem. 13, 312-318, doi:10.1039/b209383 a (2003).
6 Hinotsu, T., Jeyadevan, B., Chinnasamy, C. N., Shinoda, K. & Tohji, K. Size and structure control of magnetic nanoparticles by using a modified polyol process. J. Appl. Phys. 95, 7477-7479, doi:10.1063/1.1688534 (2004).
7 Pearson, W. B. Handbook of Lattice Spacings and Structures of Metals. Vol. 2 (Pergamon Press, 1967).
8 Cheng, J. et al. Density Functional Theory Study of Iron and Cobalt Carbides for Fischer-Tropsch Synthesis. J. Phys. Chem. C 114, 1085-1093, doi:10.1021/jp908482q.

9 Tan, K. F., Xu, J., Chang, J., Borgna, A. & Saeys, M. Carbon deposition on Co catalysts during Fischer-Tropsch synthesis: A computational and experimental study. J. Catal. 274, 121-129, doi:10.1016/j.jcat.2010.06.008.

10 Beitel, G. A., de Groot, C. P. M., Oosterbeek, H. & Wilson, J. H. A Combined in-Situ PM-RAIRS and Kinetic Study of Single-Crystal Cobalt Catalysts under Synthesis Gas at Pressures up to 300 mbar. The Journal of Physical Chemistry B 101, 4035-4043 (1997).

11 Xiong, J. et al. The formation of Co2C species in activated carbon supported cobalt-based catalysts and its impact on Fischer-Tropsch reaction. Catal. Lett. 102, 265-269 (2005).

12 Bezemer, G. L. et al. Cobalt particle size effects in the Fischer-Tropsch reaction studied with carbon nanofiber supported catalysts. J. Am. Chem. Soc. 128, 3956-3964, doi:10.1021/ja058282w (2006).

13 Stolbov, S., Hong, S. Y., Kara, A. & Rahman, T. S. Origin of the C-induced p4g reconstruction of Ni(001). Physical Review B 72, doi:155423 10.1103/PhysRevB.72.155423 (2005).

14 Lee, B. W., Alsenz, R., Ignatiev, A. & Van Hove, M. A. Surface structures of the two allotropic phases of cobalt. Physical Review B 17, 1510 (1978).

15 Wiltner, A. & Linsmeier, C. Formation of endothermic carbides on iron and nickel. Physica Status Solidi a-Applied Research 201, 881-887, doi:10.1002/pssa.200304362 (2004).

16 Pola, J. et al. IR laser-induced formation of amorphous Co—C films with crystalline Co, Co2C and Co3C nanograins in a graphitic shell. Journal of Photochemistry and Photobiology a-Chemistry 210, 153-161, doi:10.1016/j.jphotochem. 2010.01.003.

17 Zaikovskii, V. I., Chesnokov, V. V. & Buyanov, R. A. State of disperse alloy particles catalyzing hydrocarbon decomposition by the carbide cycle mechanism: TEM and FDX studies of the Cu—Ni/Al2O3 and Cu—Co/Al2O3 catalysts. Kinetics and Catalysis 47, 603-609, doi:10.1134/s0023158406040173 (2006).

18 Huo, J. P., Song, H. H., Chen, X. H., Zhao, S. Q. & Xu, C. M. Structural transformation of carbon-encapsulated iron nanoparticles during heat treatment at 1000 degrees C. Mater. Chem. Phys. 101, 221-227, doi:10.1016/j.matchemphys.2005.12.048 (2007).

19 Carroll, K. J., Reveles, J. U., Shultz, M. D., Khanna, S, N. & Carpenter, E. E. Preparation of Elemental Cu and Ni Nanoparticles by the Polyol Method: An Experimental and Theoretical Approach. J. Phys. Chem. C 115, 2656-2664, doi:10.1021/jp1104196 (2011).

20 Fischer, R., Schrefl, T., Kronmüller, H. & Fidler, J. Grain-size dependence of remanence and coercive field of isotropic nanocrystalline composite permanent magnets. J. Magn. Magn. Mater. 153, 35-49 (1996).

21 Billoni, O. V., Urreta, S. E., Fabietti, L. M. & Bertorello, H. R. Dependence of the coercivity on the grain size in a FeNdB+[alpha]Fe nanocrystalline composite with enhanced remanence. J. Magn. Magn. Mater. 187, 371-380 (1998).

22 Feng, W. C., Gao, R. W., Li, W., Han, G. B. & Sun, Y. Dependence of coercivity on phase distribution and grain size in nanocomposite Nd2Fe14B/alpha-Fe magnets. Chinese Physics 14, 1649-1652 (2005).

23 Kresse, G. & Furthmuller, J. Efficient iterative schemes for ab initio total-energy calculations using a plane-wave basis set. Physical Review B 54, 11169-11186 (1996).

24 Kresse, G. & Hafner, J. Norm-conserving and ultrasoft pseudopotentials for first-row and transition-elements. Journal of Physics-Condensed Matter 6, 8245-8257 (1994).

25 Kresse, G. & Joubert, D. From ultrasoft pseudopotentials to the projector augmented-wave method. Physical Review B 59, 1758-1775 (1999).

26 Becke, A. D. A new mixing of hartree-fock and local density-functional theories. J. Chem. Phys. 98, 1372-1377 (1993).

27 Dudarev, S. L., Botton, G. A., Savrasov, S. Y., Humphreys, C. J. & Sutton, A. P. Electron-energy-loss spectra and the structural stability of nickel oxide: An LSDA+U study. Physical Review B 57, 1505-1509 (1998).

28 Perdew, J. P., Burke, K. & Ernzerhof, M. Generalized gradient approximation made simple. Phys. Rev. Lett. 77, 3865-3868 (1996).

29 Monkhorst, H. J. & Pack, J. D. Special points for brillouin-zone integrations. Physical Review B 13, 5188-5192 (1976).

30 Wohlfarth, E. P. Relations between Different Modes of Acquisition of the Remanent Magnetization of Ferromagnetic Particles. J. Appl. Phys. 29, 595-596 (1958).

Example 2. Extension of Findings with Co to Other Group II Elements

The results described in Example 1 can be extrapolated to alloy materials made with other metals. For example, calculations involving $Fe_3C$ indicate that the Fe sites have a moment of $2.58\mu_B$/atom and an energy difference of 0.815 meV/$Fe_3C$ between the easy axis and hard axis. The corresponding calculated moment per atom in bulk BCC Fe is $2.76\mu_B$/atom with an energy difference of 0.0092 meV/atom. These calculations indicate that by substituting iron for cobalt, the energy product of the resulting magnetic material could increase by 50% over the cobalt.

When complete information regarding a chemical mechanism is lacking, energy calculations can be used to successfully predict additional metals that might be employed in a synthesis method. For example, using the deMon2k software, a variational fitting of the Coulomb potential is employed to avoid the calculation of four-center electron repulsion integrals using the GEN-A2 function set. The exchange-correlation potential is calculated via a numerical integration from the orbital density. All electrons are treated explicitly using the double-$\xi$ valence plus polarization basis sets optimized for generalized gradient functionals. A quasi-Newton method in delocalized internal coordinates is used for the geometry optimization. Several initial configurations are considered and the geometries fully optimized without any symmetry constraints to determine the ground state of the different species that are further ascertained through frequency analysis.

The cobalt carbide nanomagnet described in Example 1 is a novel material that demonstrates properties not found in the original bulk materials. When initial calculations are performed on the system, the particular origins of the high coercivity become clear. First principles theoretical studies examined the magnetic moment and the magneto-crystalline anisotropy of the $Co_2C$ and $Co_3C$ phases. The studies were conducted within a density functional framework using the Vienna Ab initio Simulation Package (VASP) and the exchange correlation contributions were incorporated using a hybrid functional B3LYP and a GGA+U approach. The magnetocrystalline anisotropy energy (MAE) was calculated using the contribution from spin-orbit coupling. For the Co$_2$C and Co$_3$C phases, the structures based on the x-ray diffraction were further optimized. Supplementary calculations were also carried out on bulk Co.

For pure β-Co, the calculated magnetic moment of 1.86 μb per atom is close to the experimental moment of 1.81 μb per atom. Theoretical studies indicate that both Co$_2$C and Co$_3$C are metallic; however, the bulk Co moment is reduced to 1.0 μb/atom for the Co$_2$C and 1.65 μb/atom for Co$_3$C phase, respectively. Our findings therefore agree with the experimental observation of the increase in magnetic moment from Co$_2$C to Co$_3$C phase. Bulk Co is a soft magnetic material and our MAE calculations indeed indicate an easy axis along [100] direction. For the [110] and [111] directions, the studies indicate a MAE per Co atom of 0.0092 and 0.0161 eV/atom, respectively. For the Co$_2$C phase, the easy axis is along the [001] direction and the MAE/atom along [111] is 0.124 eV/Co2C. The Co$_3$C phase, however, is unique. It has a [100] easy axis but the MAE increases to 0.15-0.19 meV/Co3C along other directions. The uniaxial anisotropy of the compound contributes to higher coercivity. Experimental results are consistent with these theoretical findings.

Figure 5:
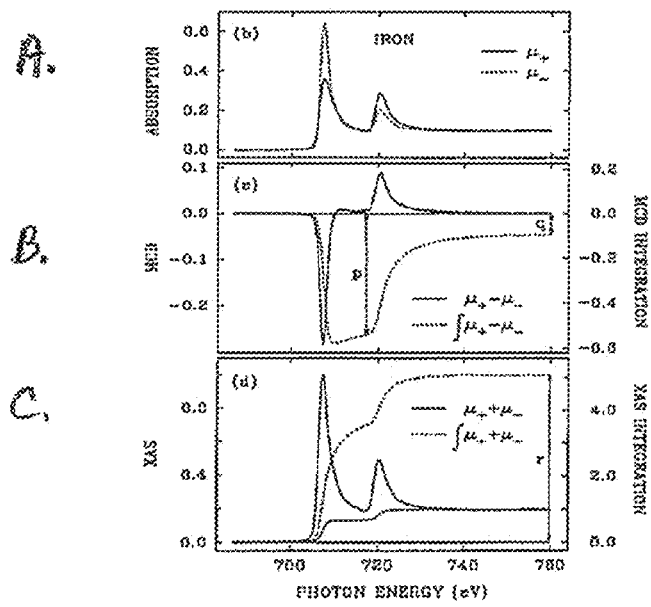
FIG. 5A-D. Depiction of XMCD sum rules. A, Helicity-dependent spectra (μ+ & μ-); B, XMCD spectrum (μ+-μ-) and XMCD integral; C, average XAS (μ++μ-) and its integral. The values p, q, and r are the integrals needed in the sum rules. D, expression for the orbital (morb) and spin (inspin) moments.

In examining complex magnetic systems, which may contain multiple magnetic elements often in multiple lattice sites or confined to specific layers in a multilayer structure, magnetization measurements that average over the whole sample can provide an incomplete picture of the interactions governing macroscopic properties. A local probe that includes magnetic sensitivity can illuminate the interactions among the various constituents; x-ray magnetic circular dichroism (XMCD) is the most well-established spectroscopic technique that can separately map out the contributions of individual components in complex magnets. XMCD provides a number of important capabilities that benefit the search for enhanced B—H product carbides: (a) element-specificity, (b) separation of spin and orbital moments, (c) sensitivity to crystal field, (d) depth-selectivity, and (e) element-specific magnetometry. In its simplest form, XMCD can be described as the differential absorption of circularly polarized x-rays based on the alignment of the helicity of the circularly polarized photons and the magnetization of the sample. XMCD consists of pairs of XAS scans with the photon helicity and the sample magnetization in an aligned or antialigned configuration (most commonly accomplished with the sample magnetized to saturation in the positive and negative directions). The XCMD spectrum is the difference between these two scans. The separation of the spin and orbital moments arises from the spin-orbit coupling that splits the atomic core levels with non-zero orbital angular momentum (i.e. l≠0, where l is the orbital angular momentum quantum number). In the case of 2nd row transition metal (TM) L edges, this results in the spin-orbit split 2p3/2 (total angular momentum J=L+S=1+½=3/2) and 2p½ (J=L-S=1-½=½). Under the dipole approximation, which is typically used to examine XAS spectra, sumrule analyses indicate that by taking properly weighted sums or differences (more accurately, integrals of these quantities) of the XMCD spectra, (FIG. 5) the orbital (morb) and spin (mspin) moments of specific elements can be measured separately, as shown in FIG. 5D.

In the expressions shown in FIG. 5D, the integration limits (e.g. L3, L2 etc.) refer to the L3 (2p3/2) and L2 (2p½) core levels, μ+ (μ-) are the XAS spectra collected in the aligned (antialigned) configurations, and the quantity (1-n3d) counts the number of unoccupied 3d states (i.e. the number of 3d holes) in the local density of states (LDOS) around the transition metal ion. The last item in brackets in the spin moment expression is a small higher-pole correction to the spin moment and is typically ignored.

In analyzing the XMCD spectra, the greatest source of uncertainty is the determination of the 3d-hole population, as both morb and nspin are directly proportional to this quantity. Comparison with first principles calculations undertaken as part of this proposal will therefore be extremely useful, as this is a quantity that comes directly from such calculations.

As mentioned above, XAS is a local probe and it is sensitive to the chemical environment surrounding the absorbing atom. The resulting spectra therefore reflect the local density of states around an atom as well as the crystal field. Multiplet effects in the spectra serve as fingerprints of both the oxidation state of cations in a sample as well as the local crystal field environment. This will be of great use in monitoring the local chemical environment around the Co atoms and other elements that are incorporated into the samples. The depth selectivity of XAS and XMCD arises from the different escape depths of the particles carrying the spectroscopic signal from the sample. Total electron yield (TEY) is the simplest method and provides a depth sensitivity of 4-10 nm from the sample surface (note this may be the surface of a nanoparticle). Partial electron yield (PEY) uses electric fields to eliminate the signal from the low energy secondary electrons, hence driving the electron mean free path down to reduce the depth sensitivity to ~0.5-1 nm. Fluorescence yield (FY) is a photon-in/photon-out technique, and hence provides much greater depth sensitivity. In the case of soft xrays, FY signals can probe buried layers dozens of nm below the surface. Therefore, by combining different measurement techniques (TEY, PEY, FY) from the same sample, a depth profile of the sample magnetometry is developed, which can in turn reveal differences in the surface magnetization and chemical composition. Such studies are used to devise strategies for successful compaction and scale-up of the discovered high B—H product materials.

Finally, field-dependence of the coupling between different magnetic elements can be revealed through element-specific magnetic hysteresis (ESMH) loops, measured with XMCD. EMSH is measured by tuning the x-ray energy to a core level of choice (e.g. the Co and/or Fe L3 edge), fixing the helicity of the x-ray beam, and recording the signal as a function of applied magnetic field. In composite systems, such measurements reveal if the switching is associated with a single phase or a single element. Also, by combining the field sweeps with the different detection methods previously mentioned, differences in the magnetometry between surface and bulk are revealed. Lastly, EMSH measurements are a key tool in investigating interfacial phenomena such as exchange bias, which are also valuable.

These calculations led to the synthesis of several different iron carbide alloys, namely Fe$_3$C, Fe$_5$C$_2$, and Fe$_7$C$_3$. The compounds have enhanced coercivities (over 100× that of bulk FexC) resulting from the increased anisotropy. Currently, the Fe$_3$C materials that have been made are larger nanoparticles. As the size is reduced the coercivities will increase as they did with the cobalt system.

Example 3. Further Developments

Permanent magnets, specifically those containing rare earth metals, are an indispensible component of many applications in electric, electronics, communications, and automobile industries. The emergence of green technology markets such as hybrid/electric vehicles (PHEVs and EVs), direct drive wind turbine power systems, and energy storage systems (eg: flywheels) has created an increased demand for permanent magnets.

Further developments regarding the synthesis of the permanent magnet cobalt carbide system allows the synthesis of next generation high energy permanent magnets with energy products exceeding 45 MGOe, providing a new class of permanent magnet materials that are superior to existing magnetic materials at a substantially reduced cost.

A wide size distribution of crystallites in the nanocluster is sometimes observed. The presence of smaller crystallites in the system can give rise to a superparamagnetic impurity that reduces the squareness of the magnetic hysteresis curve. The size and distribution of the nanoparticles is controlled thereby increasing the overall remanence magnetization. In addition, controlling the size allows the creation of specific sized particles that are used in exchanged coupled nanocomposites. Particle or cluster size is controlled, for example, by reaction time, concentration of the precursors, and pH. Surfactants may also be utilized. Polyvinylpyrrolidone (PVP) is a surfactant commonly used in the polyol process to control particle size. Due to cobalt's preference for Co—N bonding rather than Co—O, PVP is preferentially absorbed on the particle surface and slows growth. The ratio of surfactant to metal concentration helps to determine the size of the particle, as does the molecular weight of the PVP. By tailoring the size of the particles, the coercivity of the system is increased. Surface effects result in an increase in coercivity to a maximum as size is reduced, providing e.g. an increase of 50% of the overall energy product. Although Other surfactants may be employed, e.g. cetyltrimethylammonium bromide, nonylphenyl polyethoxylates, and polyvinyl alcohols are used to control the particle size in the polyol process.

Shape anisotropy is introduced to carbide particles to increase the coercivity. In Co nanoparticle systems, this has resulted in an 800% increase in the overall coercivity of the system is approximately doubled, resulting in dramatically increased coercivities and energy products, leading to an energy product increase of above 20 MGOe. In the polyol process, shapes are created by four different methods: solvent, surfactants, catalysts, and reaction conditions. Complex shapes of copper nanoparticles have been made by varying the solvent used in the system. When the surfactants absorb on the surface of the growing nuclei, they do not affect the growth along all crystal planes in the same way. This can lead to the formation of rods, cubes, or ellipsoids. Shape is also controlled by using catalysts such as ruthenium chloride. Reaction conditions also can affect the size of growing nanoparticles. By varying the temperature, precursors, stirring method, and the pH of the reaction solution, particles with a variety of lengths and aspect ratios are formed.

In addition, (BH)max is increased through exchange coupling. In exchange coupling, the high magnetization of soft magnetic materials is coupled with the high coercivity of hard magnetic materials. The development of these exchanged coupled magnets can be through two very different routes: Core-shell morphology and nanocomposites. Core-shell nanoparticles can be synthesized by controlling the precipitation and growth steps of the reaction. For example, one metal is allowed to nucleate and grow before another metal is introduced. The thermodynamics of crystal growth favor the growth of a particle over the nucleation of another. As a result, the second metal grows on the first, creating the core-shell particle. Various soft magnetic metals and alloys as used as cores for a cobalt shell since hard magnetic carbides are more air stable and provide greater protection of the soft metallic cores. Alternate materials are used to replace the cobalt carbides. The second major method for achieving exchange coupling is through mixing of nanocomposite materials. For example, hard and soft magnetic materials are created separately and then physically mixed together and compacted. Two different polyol reactions are conducted together and the products are mixed immediately prior to particle clean-up, providing uniformity. By mixing two different sizes of particles, a greater packing density is attained, further improving the overall magnet properties. Particle size is determined using Hume-Rothery rules, which are based on the simple geometry of stacked rigid spheres of different sizes. Optimal packing occurs when the ratio of the radii between the spheres is 0.414 to 0.732. So for example, 20 nm iron cobalt nanoparticles are used with 30 nm cobalt carbide nanoparticles. This doubles the overall magnetization, resulting in a 3× increase in the energy product.

An important step in the treatment of compacts is sintering. The goal of sintering is to further improve the density of the compacts. Sintering also affects, either positively or negatively, the sample microstructure. Because sintering temperatures and times affect both density and morphology, the interplay of the two is carefully controlled. In the case of crystallographic texture, optimal density is achieved without inducing secondary recrystallization, since recrystallization could result in the loss of much of the crystallographic texture and hence lower the Br and consequently the (BH) max.

For batch scale-up, the laboratory synthesis is essentially carried out in larger reactors and the mixing, heating, and material handling are optimized. For large scale syntheses, overhead stirring is viable. Consequently, the effects of stirring on the morphology and magnetic properties of the system are evaluated. In the laboratory syntheses, magnetic stirring resulted in more blade-like particles while overhead stirring leads to more spherical particles. In both cases, the magnetic properties are the same. In larger reaction volumes, where the mixing is less efficient, diffusion is a concern; therefore different stirring conditions are evaluated for impact on the product. Because mixing is less efficient in large batches, material handling is also an issue and considered. Heating is also controlled. On a 100 ml scale, the heating rate is controlled, e.g. at 15° C./minute. The process is adjusted for larger volumes, e.g. 5 or more liters. Microwave heating may be used. Flow processing, described in Example 4 below, is used to produce the material for production of magnets.

Theoretical calculations (e.g in situ x-ray adsorption spectroscopy (XAS), x-ray magnetic circular dichrosim (XMCD), mechanistic modeling, etc. are used to identify additional substitutional metals or intercalates that further increase the energy product. In addition, other compositions are identified as substitutions for Co and/or C and are synthesized. For example, iron is an alternate to cobalt. Using the higher magnetization of iron and the higher anisotropy energy of iron carbide, the energy product is increased as much as 500%, thereby increasing the energy product of above 40 MGOe. Pressing (compaction) and sintering increase the energy product by over 100% due in part to alignment of the magnetic moment. Through this series of improvements, the 45 MGOe goal is attained.

The technology is scaled up to industrial scales of powder processing, engineering of finish components, for the design, fraction, and testing of PM motor prototypes.

Example 4. Flow Through Reactor for the Synthesis of Magnetic Nanoparticles

Wet chemical synthesis of nanoparticles provides the greatest control over the morphology and composition of the products. Additionally, wet chemical synthesis is the only method that can yield core-shell nanoparticles which have tremendous application in catalytic reactions as well as electronic and biomedical applications.

With the growth in potential nanotechnology applications, different methods are being developed to synthesize nanoparticles or nanocatalysts. These nanoparticle synthesis methods are typically conducted as bench-scale batch reactions as proof-of-concept studies. Subsequent practical applications of nanoparticles necessitate the production of large quantities of uniformly functional particles. Thus a critical step in bringing such applications to main stream use is to increase throughput of nanoparticle synthesis while maintaining uniform functional properties.

To that end, we have designed and fabricated a microfluidic reactor for the synthesis of the nanoparticles described herein. The microfluidic reactor module was attached to a T-mixer with peristaltic pumps for the two feed streams. Silver nanoparticles were synthesized as follows: a first stream was a mixture of 0.01 M silver nitrate and a second stream was a mixture of 2M formaldehyde and sodium hydroxide. The two streams were mixed to maintain a 1:1 ratio of NaOH to $AgNO_3$. At a flow rate of 1.5 ml/min, the mean residence time in the reactor was approximately 4 minutes. Synthesized nano-silver particles were collected, washed and dried in a vacuum over at 37° C. overnight. The nanoparticles were analyzed using X-ray diffraction (XRD). The results showed that a wide range of size distributions of the nanoparticles was produced. To narrow the range, the mixing rate of the two streams is adjusted to provide a more uniform flow.

Additional nanoparticles are synthesized using continuous flow, including:
1) $Fe_2O_3$ and $Fe_3O_4$ nanoparticles, by using a metal salt solution of $FeCl_2$ and a base solution of $NH_4OH$ with the surfactant system of aerosol bis(2-ethylhexyl)sodium sulfosuccinate (AOT)-isooctane.
2) CdS, using $CdCl_2$ as the cation solution and $Na_2S$ are the anion solution with the surfactant system of AOT-isooctane.
3) Fe, using $FeCl_2$ as the cation solution and $NaBH_4$ as the reducing agent with the surfactant system nonyl phenol polyethoxylate-toluene.
4) Cobalt carbides, using $CoCl_2$ in tetraethylene glycol and NaOH in tetraethylene glycol.

Example 5. Ethanol Assisted Reduction and Nucleation of Ferromagnetic Co and Ni Nanocrystalline Particles The solvent assisted reduction of late row 3d transition metals commonly employs solvent systems such as polyhydric alcohols or long chain alkylamines. In this report, we investigate the ability of a primary alcohol to reduce Co and Ni. Using a solvothermal approach, we demonstrate the reduction and nucleation of Co and Ni particles using ethanol as a solvent and reducing agent. Nucleated Co and Ni particles were polycrystalline with grain sizes of 25 and 34 nm, respectively. Ni particles were spherical in shape with average diameters of 300 nm, while the Co particles agglomerated heavily, into micron scale secondary particles. High resolution transmission electron microscopy imaging revealed the presence of stacking faults in the synthesized Co particles. The highly crystalline Ni and Co particles display room temperature ferromagnetism, possessing magnetic saturation values comparable to bulk Ni and Co. The results presented provide a foundation for the use of primary alcohols as an effective and cost efficient reducing agent for other transition metal particle systems.

Nanocrystalline magnetic materials draw considerable attention due to their interesting magnetic properties when compared to bulk materials.[1] Through proper control of a particle's crystal grain size and shape, magnetic properties can be manipulated for the particle system. A common method used to accomplish control of a particle's shape and size is a solution based synthetic route.[1] The solution based synthesis of magnetic nanoparticles commonly employs a reducing agent and heat to initiate a redox reaction, where the reducing agent can be in the form of a reactant, like borohydride based salts and hydrazine, or in the form of a solvent with sufficient reducing ability.[1]

The most common solvents used for the solvent assisted reduction of magnetic nanoparticles are polyhydric alcohols (polyols) and long chain alkylamines.[1-7] Fievet et al. first demonstrated the ability to reduce of $Ni(OH)_2$ and $Co(OH)_2$ in ethylene glycol to form magnetic particles in 1988.[8] Since this initial discovery, numerous ferromagnetic particle systems in a wide range of polyhydric alcohols have been investigated. While numerous reports demonstrate the solvent assisted reduction and formation of Ni and Co magnetic particles in polyols and alkylamines, no reports of using lower boiling point primary alcohols as a reducing agent to synthesize Ni and Co particles exist.[2,3,5-7,9] The use of lower boiling point solvents can increase cost efficiency by lowering energy consumption leading to a more industrially viable process. In this study, we report the synthesis of Ni and Co particles using ethanol as a solvent and reducing agent.

While the synthesis of Ni and Co nanoparticles using ethanol as a reducing agent has not been reported, the reduction of Ni and Co by ethanol has been observed during the catalytic process of Ethanol Steam Reforming (ESR) and when using primary alcohols under supercritical conditions.[10-12] To investigate the viability of ethanol as a reducing agent for the synthesis of Ni and Co particles under sub-critical conditions, 1 mmol of nickel or cobalt acetate was dissolved in 25 mL of a 95% ethanol solution. Along with the nickel and cobalt precursors $6 \times 10^{-3}$ mmol of $K_2PtCl_4$ was added as a nucleating agent. The solution was then sonicated to dissolve the metal salts, sealed in a 50 mL capacity autoclave and heated to 200° C. for 2.5 hours. The vessels were then cooled to room temperature and the resulting particles were rinsed with ethanol and magnetically separated.

The heterogenenous nucleation of Ni particles formed pure phase face centered cubic (FCC) Ni with an average crystal grain size of 34 nm. Reduction of cobalt acetate nucleated particles comprised of 54% hexagonal close packed Co (HCP) and 46% FCC—Co crystal phases. A two phase system consisting of HCP—Co and FCC—Co is commonly observed in the solution based of Co particles, and can be attributed to the low energy barrier required for stacking fault formation to occur between the Co allotropic structures.[3,9,13,14] The formation of stacking faults commonly introduces disorder along the HCP (011) plane, which can be witnessed as broadening of the HCP (011) peak when compared to the other HCP peaks for the as prepared Co particles.[3] The grain sizes for the HCP and FCC—Co phases were calculated to be 25 nm and 28 nm, respectively. Crystal structure refinement for the FCC—Ni, FCC—Co, and HCP—Co revealed lattice constants slightly increased over bulk values.[15] Inductively Coupled Plasma-Optical Emission Spectroscopy (ICP-OES) revealed Pt molar percentages relative to Ni and Co of 0.22% and 0.94%, respectively. The results from crystal structural refinement and ICP-OES indicate alloy formation to occur between Ni or Co and Pt atoms employed as a nucleating agent.

TABLE 1

Refined Lattice Parameters for FCC Ni, FCC-Co, and HCP-Co phases (Bulk values below refined values in brackets)

| Phase | Space Group | Lattice Parameters (A) | | | Mass % Pt[a] | Molar % Pt[a] |
|---|---|---|---|---|---|---|
| | | a | b | c | | |
| FCC-Ni | Fm-3m | 3.526 [3.52] | — | — | 0.74 | 0.22 |
| FCC-CO | Fm-3m | 3.546 [3.544] | — | — | 3.12 | 0.94 |
| HCP-Co | P63mmc | 2.514 [2.507] | — | 4.105 [4.070] | 3.12 | 0.94 |

[a]Pt percentages measured using ICP-OES

Transmission Electron Microscopy (TEM) images of the synthesized Ni particles revealed the particles to be spherical in shape with an average diameter of 300 nm. The observed particle diameter far exceeded the crystal grain size calculated from XRD revealing the particles to be polycrystalline in nature. Synthesized Co particles were observed to agglomerate heavily into secondary particles several microns in diameter. High resolution TEM imaging revealed the presence of interesting crystallographic features in the Co particle system. Lattice spacings of 1.28 nm were observed in select Co particles. The observed lattice spacings for the Co particles are significantly larger than lattice spacing for the Co (FCC or HCP) allotropes and are indicative of long range crystallographic ordering. The common observance of stacking faults in Co particles containing the FCC and HCP phases is a possible explanation for the large lattice spacings, however at this time further investigation is required to better understand this intriguing crystallographic ordering.[14] Inspection of the Ni and Co particle's surface showed very little presence of an organic capping layer which is commonly witnessed when employing higher boiling point solvents. However, thermogravimetric analysis identified the presence of volatile organic adsorbates resulting in a 2.5% weight decrease when heating the particles to 200° C. A typical TGA curve is shown in FIG. 6.

Room temperature magnetization versus applied field (M(H)) curves show the Ni and Co particles to possess magnetic saturation ($M_s$) values of 51 emu/g and 148 emu/g, respectively (FIG. 7A). These $M_s$ values compare well to the bulk magnetization of 58 emu/g for Ni and 163 emu/g for Co.[16] Coercivity values of 180 Oe were recorded for the Co and Ni systems. For the Ni particles, this coercivity is increased over Ni bulk value; however this is common for magnetic nanomaterials as the crystal grain size approaches their critical magnetic domain size.[17-19] For the Co particles, the presence of the hard ferromagnetic HCP—Co phase also causes an increase in coercivity over pure FCC—Co.[20] Zero field cooled (ZFC) curves for Ni and Co exhibited magnetic blocking events below room temperature, again consistent with crystal grain sizes approaching the critical magnetic domain size. Field cooled (FC) magnetization versus temperature plots for the Ni and Co particles show little variance in magnetic susceptibility from 50K to 300 K, indicative of a strongly interacting ferromagnetic system[21] (FIG. 7B). The ZFC curve for Co shows an inflection point at 160 K, which is common for Co nanomaterials. This phenomena can be attributed to overcoming the Neél temperature of CoO.[17] This confirmation of a slight amount of CoO coupled with the small CoPt alloy formation and organic adsorbates all help explain the slight decrease in $M_s$ values for the as synthesized Co particles when compared to bulk values.

The purpose of this report was to investigate the effectiveness of ethanol as a solvent for the assisted reduction and formation of Co and Ni nanocrystalline particles. To induce particle formation, $K_2PtCl_4$ was utilized as a nucleating agent to promote heterogeneous nucleation. XRD revealed the Ni and Co particles to be nanocrystalline in nature. TEM showed that while nanocrystalline in nature, the Ni and Co formed polycrystalline particles of 300 nm and 500 nm and greater in diameter, respectively. Magnetization values for the synthesized Ni and Co particles compare well with bulk magnetizations.[16] This report demonstrates that low boiling point primary alcohols can acts as efficient solvents for the solvent assisted reduction of ferromagnetic Co and Ni nanocrystalline particles. With the use of low boiling point solvents, such as ethanol, a more cost efficient and environmental friendly process for the synthesis of ferromagnetic nanocrystalline particles can be realized.

REFERENCES FOR EXAMPLE 5

(1) Willard, M. A.; Kurihara, L. K.; Carpenter, E. E.; Calvin, S.; Harris, V. G. International Materials Reviews 2004, 49, 125-170.
(2) Carroll, K. J.; Reveles, J. U.; Shultz, M. D.; Khanna, S, N.; Carpenter, E. E. Journal of Physical Chemistry C 2010, 115, 2656-2664.
(3) Chakroune, N.; Viau, G.; Ricolleau, C.; Fievet-Vincent, F.; Fievet, F. Journal of Materials Chemistry 2003, 13, 312-318.
(4) Sun, S. H.; Murray, C. B.; Weller, D.; Folks, L.; Moser, A. Science 2000, 287, 1989-1992.
(5) Ung, D.; Soumare, Y.; Chakroune, N.; Viau, G.; Vaulay, M. J.; Richard, V.; Fievet, F. Chemistry of Materials 2007, 19, 2084-2094.
(6) Ung, D.; Viau, G.; Ricolleau, C.; Warmont, F.; Gredin, P.; Fievet, F. F. Advanced Materials 2005, 17, 338-+.
(7) Viau, G.; Garcia, C.; Maurer, T.; Chaboussant, G.; Ott, F.; Soumare, Y.; Piquemal, J. Y. Physica Status Solidi a-Applications and Materials Science 2009, 206, 663-666.
(8) Fievet, F.; Lagier, J. P.; Blin, B.; Beaudoin, B.; Figlarz, M. Solid State Ionics 1989, 32-3, 198-205.
(9) Hinotsu, T.; Jeyadevan, B.; Chinnasamy, C. N.; Shinoda, K.; Tohji, K. Journal of Applied Physics 2004, 95, 7477-7479.
(10) Bayram, B.; Soykal, I. I.; von Deak, D.; Miller, J. T.; Ozkan, U.S. Journal of Catalysis 2011, 284, 77-89.
(11) Choi, H.; Veriansyah, B.; Kim, J.; Kim, J. D.; Kang, J. W. Journal of Supercritical Fluids, 52, 285-291.
(12) Kim, J.; Kim, D.; Veriansyah, B.; Kang, J. W.; Kim, J.-D. Materials Letters 2009, 63, 1880-1882.
(13) Victor Antonio de la Pena, O. S.; Iberia de, P. R. M.; Alberto, R.; Francesc, I. The Journal of Chemical Physics 2010, 133, 024701.
(14) Dureuil, V.; Ricolleau, C.; Gandais, M.; Grigis, C. European Physical Journal D 2001, 14, 83-88.
(15) Pearson, W. B. Handbook of Lattice Spacings and Structures of Metals; Pergamon Press: London, 1967; Vol. 2.
(16) CRC Handbook of Chemistry and Physics; 55 ed.; CRC Press: Cleveland, Ohio, 1974.

(17) Gangopadhyay, S.; Hadjipanayis, G. C.; Sorensen, C. M.; Klabunde, K. J. Magnetics, IEEE Transactions on 1992, 28, 3174-3176.
(18) Gong, W.; Li, H.; Zhao, Z. G.; Chen, J. C. Journal of Applied Physics 1991, 69, 5119-5121.
(19) Du, Y. W.; Xu, M. X.; Jian, W.; Shi, Y. B.; Lu, H. X.; Xue, R. H. Journal of Applied Physics 1991, 70, 5903-5905.
(20) Sato, H.; Kitakami, O.; Sakurai, T.; Shimada, Y.; Otani, Y.; Fukamichi, K. Journal of Applied Physics 1997, 81, 1858-1862.
(21) Dormann, J. L., Fiorani, D Magnetic Properties of Fine Particle Systems; North-Holland: Amsterdam, 1992.

While the invention has been described in terms of its preferred embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A method of synthesizing single phase non-rare earth metal carbide nanoparticles, comprising:
   introducing continuously one or more fluid solutions comprising a salt of a metal into a continuous flow reactor;
   in the continuous flow reactor, subjecting said one or more fluid solutions to conditions which allow said salt of the metal to form said single phase non-rare earth metal carbide nanoparticles, wherein said subjecting step includes for a period of time maintaining said one or more fluid solutions at a pressure and temperature sufficient to convert the one or more fluid solutions to a supercritical fluid (SCF); and
   recovering said single phase non-rare earth metal carbide nanoparticles,
   wherein said single phase non-rare earth metal carbide nanoparticles consist of a material selected from the group consisting of $Co_2C$ and $Co_3C$.

2. A method of synthesizing single phase non-rare earth metal carbide nanoparticles, comprising:
   introducing continuously one or more fluid solutions comprising a salt of a metal into a continuous flow reactor:
   in the continuous flow reactor, subjecting said one or more fluid solutions to conditions which allow said salt of the metal to form said single phase non-rare earth metal carbide nanoparticles, wherein said subjecting step includes for a period of time maintaining said one or more fluid solutions at a pressure and temperature sufficient to convert the one or more fluid solutions to a supercritical fluid (SCF): and
   recovering said single phase non-rare earth metal carbide nanoparticles,
   wherein said single phase non-rare earth metal carbide nanoparticles consist of a material selected from the group consisting of $Fe_3C$, $Fe_5C_2$, and $Fe_7C_3$.

* * * * *